US012576942B2

(12) United States Patent
Diaz

(10) Patent No.: US 12,576,942 B2
(45) Date of Patent: Mar. 17, 2026

(54) SUSPENSION FORK

(71) Applicant: Anthony Diaz, Durango, CO (US)

(72) Inventor: Anthony Diaz, Durango, CO (US)

( * ) Notice: Subject to any disclaimer, the term of this patent is extended or adjusted under 35 U.S.C. 154(b) by 493 days.

(21) Appl. No.: 18/197,575

(22) Filed: May 15, 2023

(65) Prior Publication Data

US 2024/0383561 A1 Nov. 21, 2024

(51) Int. Cl.
*B62K 25/06* (2006.01)
*F16F 9/02* (2006.01)

(52) U.S. Cl.
CPC ............ *B62K 25/06* (2013.01); *F16F 9/0227* (2013.01); *F16F 2230/007* (2013.01); *F16F 2232/08* (2013.01)

(58) Field of Classification Search
CPC ........ B62K 25/08; B62K 25/06; F16F 9/0227
USPC ......................................................... 280/276
See application file for complete search history.

(56) References Cited

U.S. PATENT DOCUMENTS

| | | | | |
|---|---|---|---|---|
| 5,725,226 A | * | 3/1998 | Cabrerizo-Pariente | ...................... B62K 25/08 188/300 |
| 6,105,988 A | * | 8/2000 | Turner | .................... F16F 9/466 188/319.1 |
| 7,900,947 B2 | * | 3/2011 | Inoue | .................... B62K 25/08 280/276 |
| 11,299,232 B2 | * | 4/2022 | Diaz | ....................... F16F 9/065 |
| 2009/0001684 A1 | * | 1/2009 | McAndrews | ........... F16F 9/466 280/276 |

* cited by examiner

*Primary Examiner* — Valentin Neacsu
*Assistant Examiner* — Hosam Shabara
(74) *Attorney, Agent, or Firm* — Bradley T. Fox

(57) ABSTRACT

A suspension fork includes a steerer tube, a crown attached to the steerer tube, and a pair of fork legs extending from the crown. Each fork leg has a hollow stanchion telescopically inserted into a hollow lower. A piston having a piston head separates the stanchion into a positive and a negative air spring chamber. A base is disposed inside the stanchion and is secured to the stanchion such that the base is arranged between a closed end of the lower and the piston head. A floating piston is slidably disposed inside the negative air spring chamber and divides the negative air spring chamber into a first chamber and a second chamber. The floating piston moves towards the piston head in response to a pressure created inside the lower to facilitate a passage of air from the lower to the second chamber through a communication port defined by the base.

17 Claims, 6 Drawing Sheets

400

402

404

SUSPENSION FORK

TECHNICAL FIELD

The present disclosure relates to vehicle suspension systems and devices, and particularly to a suspension fork having an air spring that facilitates a gradual stop of a stanchion inside a lower during an end of a retraction stroke of the stanchion.

BACKGROUND

Suspension forks have an upper crown connected to a steering tube. The fork stanchions are coupled to the crown on either side. The current state of the art is comprised of a negative air chamber inside the stanchion tube to make a fork softer initially. However, in this configuration, as the piston moves higher up in the stanchion tube, volume of the positive air spring chamber starts to decrease too much and the air spring starts to ramp too much. Other way, to increase negative air chamber volume without compromising the positive air volume, is to move the seal head lower in the stanchion tube. However, as the seal head is moved lower, the air inside the lower acts like an air spring itself when the fork is compressed, causing a sudden spike in pressure, resulting into a hard stop for the stanchion inside the lower, which is undesirable.

SUMMARY

One aspect of the disclosure is to provide a suspension fork that provides a gradual stop during the retraction of a stanchion inside the lower rather than a hard stop. According to this aspect, a pressure spike is controlled inside the lower by allowing an exit of the air/gas from the lower during an end portion of the retraction stroke.

In some embodiments, the suspension fork includes a steerer tube, a crown attached to the steerer tube, and a pair of fork legs extending from the crown. Each of the fork legs has a hollow stanchion telescopically inserted into an open end of a hollow lower. The suspension fork also includes a piston having a piston rod secured to at least one of the lowers and a piston head and a seal disposed in the corresponding stanchion. The piston head separates the stanchion into a positive and a negative air spring chamber. The suspension fork also includes a base disposed inside the stanchion and secured to the stanchion. The base is arranged between a closed end of the lower and the piston head, and the negative air spring chamber is defined between the piston head and the base. Moreover, the base defines at least one communication port to enable a flow of air between the hollow lower and the negative air spring chamber. Furthermore, the suspension fork includes a floating piston slidably disposed inside the negative air spring chamber and dividing the negative air spring chamber into a first chamber and a second chamber. The floating piston is adapted to move towards the piston head in response to a pressure created inside the lower during a translation of the stanchion towards the closed end of the lower to facilitate a passage of air from the lower to the second chamber through the at least one communication port.

According to some aspects of the disclosure, a shock absorber is disclosed. The shock absorber includes a first tube, a second tube telescopically inserted into an open end of the first tube, and a piston having a piston rod secured to the first tube and a piston head disposed inside the second tube. The piston head separates the second tube into a positive and a negative air spring chamber. The shock absorber further includes a base disposed inside the second tube and secured to the second tube, wherein the base is arranged between a closed end of the first tube and the piston head, and the negative air spring chamber is defined between the piston head and the base. Moreover, the base defines at least one communication port to enable a flow of air between the first tube and the negative air spring chamber. Furthermore, the shock absorber includes a floating piston slidably disposed inside the negative air spring chamber and dividing the negative air spring chamber into a first chamber and a second chamber. The floating piston is adapted to move towards the piston head in response to a pressure created inside the first tube during a translation of the second tube towards the closed end of the first tube to enable a passage of air from the first tube to the second chamber through the at least one communication port.

In some aspects of the disclosure, a suspension fork is provided. The suspension fork includes a steerer tube, a crown attached to the steerer tube, and a pair of fork legs extending from the crown. Each of the fork legs has a hollow stanchion telescopically inserted into an open end of a hollow lower. The suspension fork also includes a piston having a piston rod secured to at least one of the lowers and a piston head and a seal disposed in the corresponding stanchion. The piston head separates the stanchion into a positive and a negative air spring chamber. The suspension fork also includes a base disposed inside the stanchion and secured to the stanchion. The base is arranged between a closed end of the lower and the piston head, and the negative air spring chamber is defined between the piston head and the base. Moreover, the base defines at least one communication port to enable a flow of air between the hollow lower and the negative air spring chamber. Furthermore, the suspension fork includes a floating piston slidably disposed inside the negative air spring chamber and dividing the negative air spring chamber into a first chamber and a second chamber. The floating piston is adapted to move towards the piston head in response to a pressure created inside the lower during a translation of the stanchion towards the closed end of the lower to facilitate a passage of air from the lower to the second chamber through the at least one communication port. The suspension fork also includes a stopper arranged inside the first chamber and spaced apart from the base to limit a movement of the floating piston in a direction towards the piston head from the base.

BRIEF DESCRIPTION OF THE ACCOMPANYING DRAWINGS

Having thus described example embodiments of the present disclosure in general terms, reference will now be made to the accompanying drawings, which are not necessarily drawn to scale:

DETAILED DESCRIPTION

Figure 1:
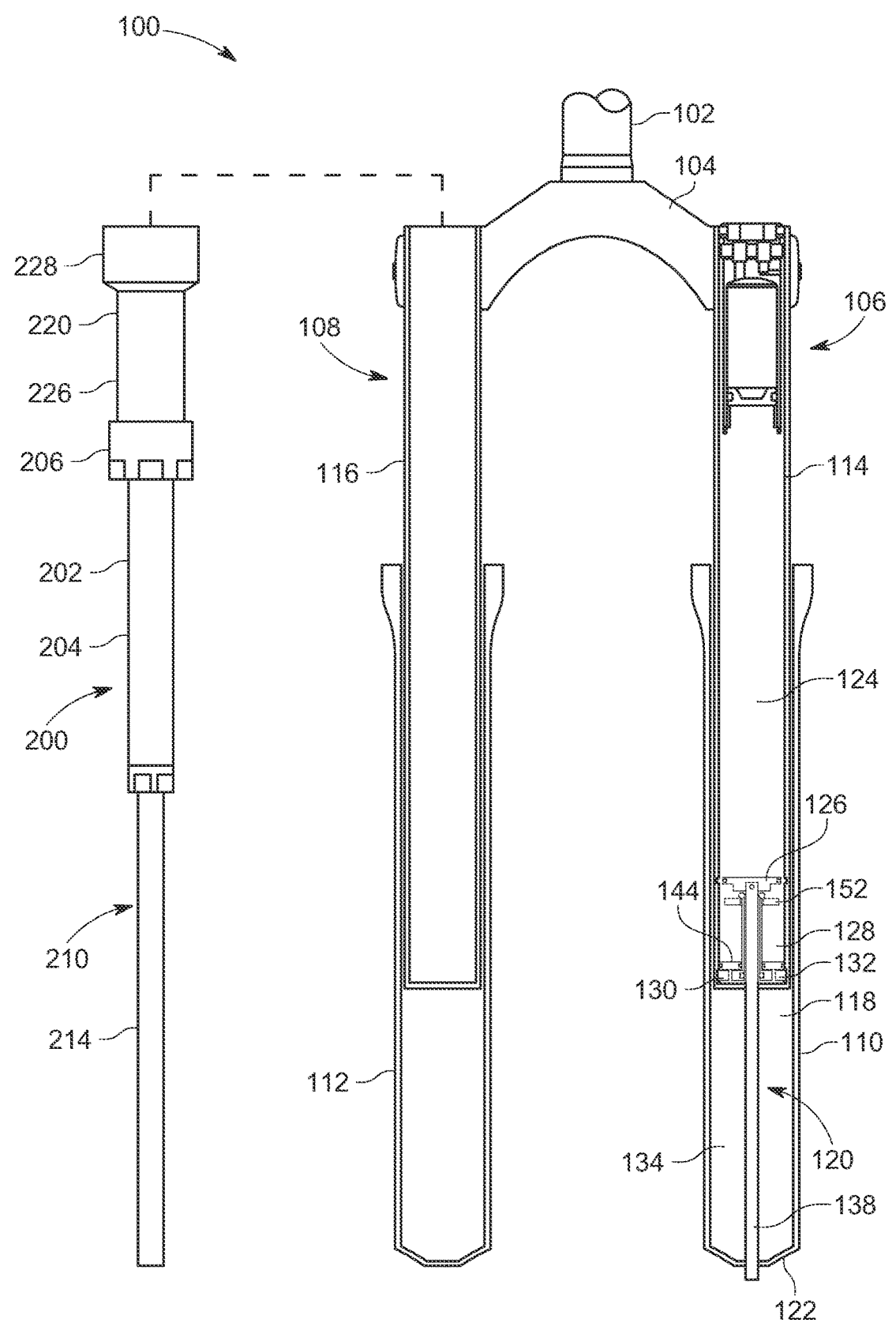
FIG. 1 illustrates a schematic of a cross-section of a suspension fork, in accordance with an embodiment of the disclosure.

In the following description, for purposes of explanation, numerous specific details are set forth in order to provide a thorough understanding of the present disclosure. It will be apparent, however, to one skilled in the art that the present disclosure can be practiced without these specific details. In other instances, apparatus and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. The use of any term should not be taken to limit the spirit and scope of embodiments of the present disclosure.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

This disclosure relates to vehicle suspension systems and devices, and particularly to vehicle suspension systems and devices having an air spring with adjustable and/or tunable characteristics. The vehicle suspension may generally include features for modifying the spring rate of an air spring, such as, for example, to increase initial suppleness and to decrease spiking during later portions of travel.

In one aspect of the invention, as illustrated in FIG. 1, a vehicle suspension device, for example, generally includes a suspension fork 100 having at least a central steering tube 102 coupled to a crown 104 which branches into two fork legs, a first fork leg 106 and a second fork leg. In general, the two fork legs may be compressible in length with a given amount of travel. Each of the fork legs 106, 108 may generally have a lower tubular portion, such as lowers 110 and 112 in FIG. 1, with an upper tubular stanchion disposed at least partially and telescopically therein, such as stanchions 114 and 116, respectively. The stanchions 114, 116 may generally have a stop or limiter such that it does not completely exit the lowers 110, 112 during operation.

In some embodiments, at least one fork leg, for example, the first fork leg 106 (i.e., shock absorber 106), generally house a pressurized air chamber 118 with a piston 120 disposed therein, where the piston 120 is able to translate within the air chamber with a fixed end attached to a closed end 122 of the lower 110. FIG. 1 illustrates the stanchion 114 (i.e., second tube) housing a first pressurized air chamber 124, which may also be referred to as a positive air spring chamber 124, with a piston 120 fixed at the bottom of the lower 110 with a piston head 126 disposed within the stanchion 114 and dividing the inside volume of the stanchion 114 into the positive air spring chamber 124 and the negative air spring chamber 128. The piston head 126 may generally include a seal, gasket and/or other appropriate feature to maintain a pressure-tight seal between positive air spring chamber 124 and the negative air spring chamber.

In some embodiments, as shown in FIG. 1, the positive air spring chamber generally occupy the space between the top of the stanchion 114, which may attach to the crown 104, and the piston head 126. When subjected to a vertical load, the piston 120 may generally push on the gas/air in the positive air spring chamber 124 and cause it to compress, initiating travel of the stanchion 114 into the lower 110 (i.e., first tube).

In exemplary embodiments, an example of which is illustrated in FIG. 1, the negative air spring chamber 128 occupies the space between the piston head 126 and the bottom of the stanchion 114. The negative air spring chamber 128 may apply pressure to the opposite side of the piston head 126. The positive and negative air spring chambers 124, 128 may be independently pressurized with gas/air, or they may be fully linked, partially linked, or selectively linked to allow gas/air to flow between them.

In an exemplary embodiment, as shown in FIG. 1, the fork 100 includes an adjustable air chamber unit 123 in addition to the positive and negative air springs 124, 128. The adjustable air chamber unit 123 may generally occupy a space at the top of the stanchion 114 (at the crown 104) and above the positive air spring chamber 124. During use, load on the fork 100 may load both the positive air spring chamber 124 and the adjustable air chamber unit 123, with the adjustable air chamber unit 123 decreasing in volume during at least part of the travel due to the increased pressure in the positive air spring chamber 124. In some embodiments, the adjustable air chamber unit may be omitted.

Figure 2:
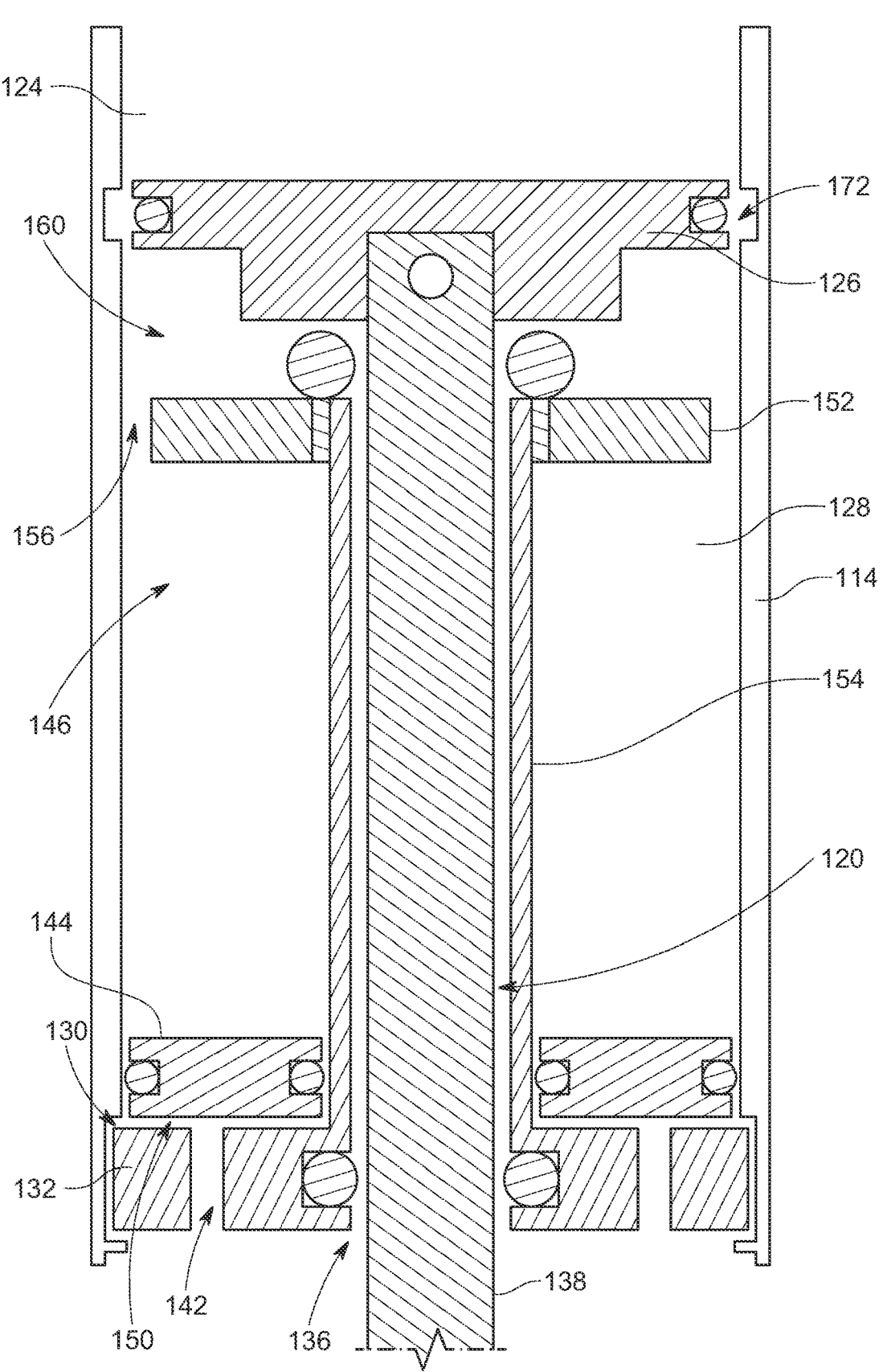
FIG. 2 illustrates an enlarged sectional view of a portion of a first fork leg of the suspension fork depicting a floating piston arranged inside a negative air spring chamber, in accordance with an embodiment of the disclosure.

Further, referring to FIG. 2, to control the pressure inside the lower 110 at the end of the travel/retraction of the stanchion 114 inside the lower 110, and gradually bringing the stanchion 114 at a stop rather than a hard/sudden stop, the suspension fork 100 includes a base structure 130 disposed inside the stanchion 114, and fixedly attached to the stanchion 114 and includes a base 132 arranged at the bottom of the stanchion 114 separating a chamber 134 defined by the lower 110 from the negative air pressure chamber 128. Accordingly, the negative air spring chamber 128 is defined between the piston head 126 and the base 132. It may be appreciated the base 132 includes a disc shape and defines a central opening 136 through which a piston rod 138 of the piston 120 extends inside the stanchion 114 to the piston head 126. One or more seals may be arranged inside the opening 136 between the base 132 and piston rod 1 to prevent a flow of gas/air therethrough. Further, the base 132 defines a communication port 142 extending from a first surface to a second surface opposite to the first surface of the base 132 to enable a gas/air flow exchange between the chamber 134 and the negative air spring chamber 128. The communication port 142 may be arranged between the opening 136 and an outer edge of the base 132.

Additionally, the shock absorber 106 includes a floating piston 144 arranged inside the negative air spring chamber 128 and configured to move between the base 132 and the piston head 126. The floating piston 144 divides the negative air spring chamber 128 between a first chamber 146 defined between the piston head 126 and the floating piston 144, and a second chamber 150 which is defined between the floating piston 144 and the base 132. In an initial position, i.e., when the stanchion 114 is arranged at the maximum possible outward position relative to the lower 110, the floating piston 144 may rest on the base 132, and the therefore a volume of the second chamber 150 is minimum. The floating piston 144 moves towards the piston head 126, thereby increasing the volume of the second chamber 150 and relatively decreasing the volume of the first chamber 146, and a pressure of air inside the chamber 134 reaches a threshold value during an end of the travel of the stanchion 114 inside the lower 110 i.e., during an end of the retraction of the stanchion 114 inside the lower 110. Therefore, a mass or weight of the floating piston 144 is selected depending on a desired threshold value of the pressure to reduce a feeling of hard stop of the stanchion 114 inside the lower 110 during the retraction stroke and provide a gradual stop. The floating piston 144 may generally include a piston head without a piston arm, as illustrated in FIGS. 1 and 2, and may also include a seal or gasket to seal and separate the first chamber 146 from the second chamber 150.

Additionally, to restrict the travel of the floating piston 144 beyond a certain location towards the piston head 126 and to prevent a contact of the floating piston 144 with the piston head 125, the shock absorber 106 may include a stopper 152 arranged inside the first chamber 146 and located proximate to the piston head 126. As shown, the stopper 152 includes a protrusion extending radially outwardly inside the first chamber 146 from a tube 154 of the base structure 130 that extends from the base 132 towards the piston head 126, surrounding the piston rod 138. However, it may be appreciated that the stopper 152 may extend radially inwardly from an inner surface of the stanchion 114. Accordingly, the stopper 152 and the base 132 together define a travel stroke of the floating piston 144 inside the negative air spring chamber 128, and the floating piston 144 reciprocates between the base 132 and the stopper 152. In some embodiments, the stopper 152 extends inside the first chamber 146 such that a free end of the stopper 152 is arranged at a radial distance/gap from the inner surface of the stanchion 114, defining a port 156 therebetween. Accordingly, a gas/air present inside the first chamber 146 may move to a piston chamber 160 through the port 156 as the floating piston 144 moves towards the piston head 126 to manage a rise in pressure inside the first chamber 146. As shown, the piston chamber 160 is defined between the stopper 152 and the piston head 126.

In this manner, when the stanchion 114 retracts inside lower 110, a volume of the chamber 134 decreases and the pressure inside chamber 134 increases. As the stanchion 114 reaches near the end of the retraction stroke, the pressure inside the chamber 134 rises to the threshold value, causing the floating piston 144 to move toward the stopper 152, allowing the gas to flow inside the negative air spring chamber 128 from the chamber 134 through the communication port 142. The exit of the gas/air from the chamber 134 allows a control of steep rise in the pressure inside the chamber 134, thereby preventing the stanchion 114 to come to sudden stop and allows a gradual decrease in the speed of the stanchion 114 to allow the stanchion 114 to gradually stop before moving in reverse direction.

Figure 3:
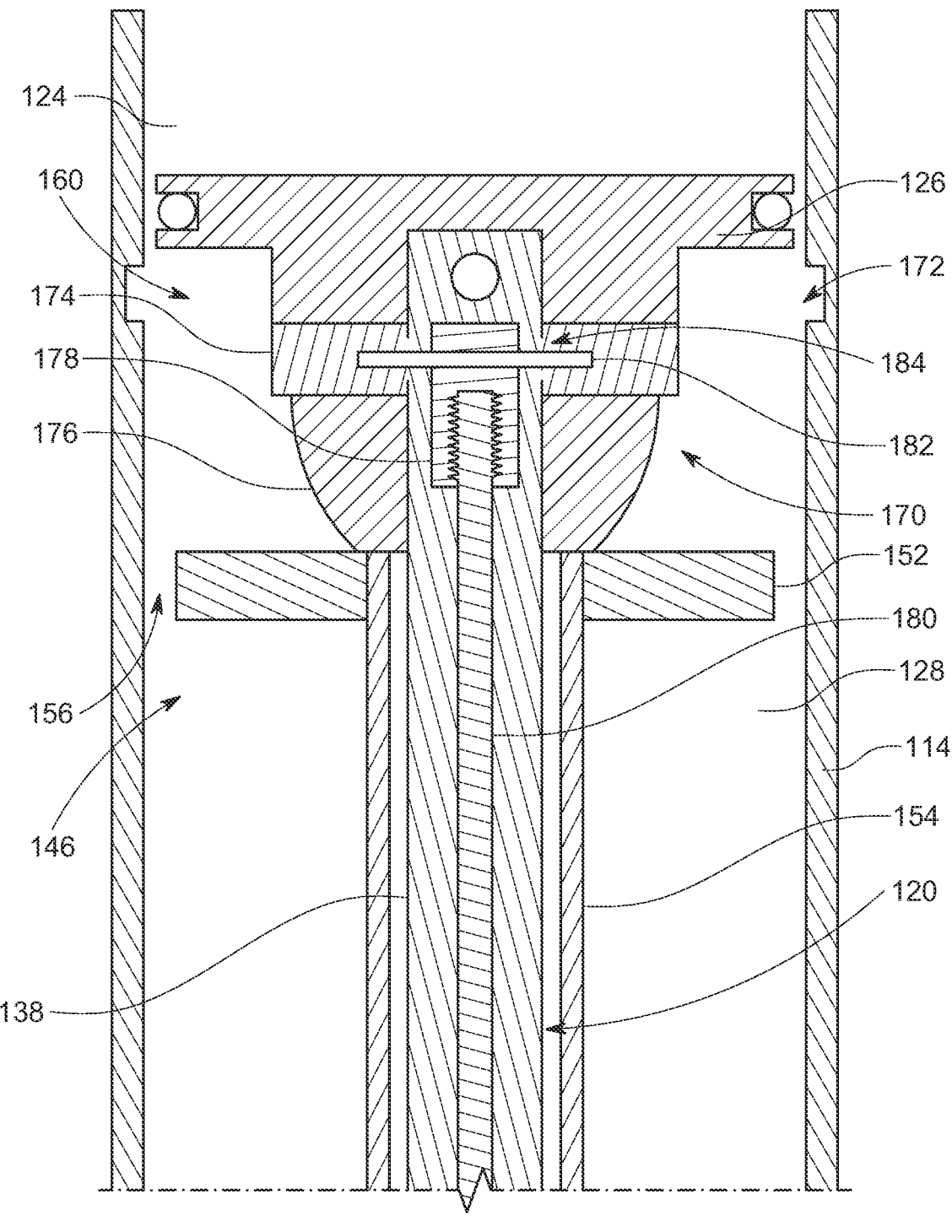
FIG. 3 illustrates an enlarged sectional view of the first fork leg of the suspension fork depicting a floating piston arranged inside a negative air spring chamber and a coil spring arranged between a piston and a stopper, in accordance with an embodiment of the disclosure.

In some embodiments, as shown in FIG. 3, the shock absorber 106 may include an adjustment assembly 170 to preload and adjust a position of the piston head 126 relative to a transfer port 172 that facilitate an exchange of air between the positive air spring chamber 124 and the negative air spring chamber 128 (i.e., piston chamber 160). As shown, the adjustment assembly 170 includes an adjustment plate 174, a spring 176, an adjustment cylinder 178 having internal threads, a rod 180 having external threads and screwed to the internal threads of the cylinder, and a connecting plate 182 coupling/attaching the cylinder 178 to the adjustment plate 174. As shown, the adjustment plate 174 is arranged inside the piston chamber 160 and surrounding the piston rod 138 and configured to move up and down relative to the piston rod 138, and the spring 176 is arranged between the tube 154 (i.e., stopper 152) and the adjustment plate 174 with one end of the spring 176 being engaged with the adjustment plate 174 and another end being engaged/abutted with the stopper 152 or the tube 154. The spring 176 is also arranged surrounding the piston rod 138 and inside the piston chamber 160. In an embodiment, the spring 176 may be a polymer spring, a coil spring, or any other spring configured to suitably preload and bias the piston head 126.

Further, the rod 180 extends inside the piston rod 138 such that an end of the rod 180 is arranged outside the closed end of the lower 110 to enable a rotation of the rod 180 relative to the cylinder 178 by a user, while another end of the rod 180 is in threaded engagement with the cylinder 178. The connecting plate 182 is attached to the cylinder 178 and extends radially outwardly of the cylinder 178 and the piston rod 138 and is connected with the adjustment plate 174. To enable the extension of the connecting plate 182 outwardly of the piston rod 138 and to enable a vertical movement of the connecting plate 182, and hence the adjustment plate 174, relative to the piston rod 138, the piston rod 138 defines an elongated radial cut 184. As the rod 180 is rotated in a first direction, the cylinder 178 may move upwardly, causing the adjustment plate 174 to move upward to bias the piston head 126 above the transfer port 172. At this position, at the beginning of piston head 126 travel i.e., movement of the stanchion 114 inside the lower 110, no air is transferred from the positive air spring chamber 124 to the negative air spring chamber 128 via the transfer port 172. This will increase the initial spring rate of the positive air spring chamber 124.

As the rod 180 is rotated in a second direction opposite to the first direction, the cylinder 178 moves downwardly, causing the connecting plate 182, and hence the adjustment plate 174 to move downwardly, compressing the spring 176 and accordingly moving the piston head 126 in line with the transfer port 172. At this position, which is also referred to as neutral position, air can pass through between the two chambers 124, 128. Upon further rotation of the rod in the second direction, the cylinder 178 moves further downward, causing the connecting plate 182, and hence the adjustment plate 174 to move downwardly, compressing the spring 176 and accordingly moving the piston head 126 below the transfer port 172. When the piston head 126 is arranged below the transfer port 172, the first part of travel of the stanchion 114 inside the lower 110 will transfer air through the transfer port from the positive air spring chamber 124 to the negative air spring chamber 128, thus the first bit of travel will be very soft as air inside the positive air spring is not compressed.

Figure 4:
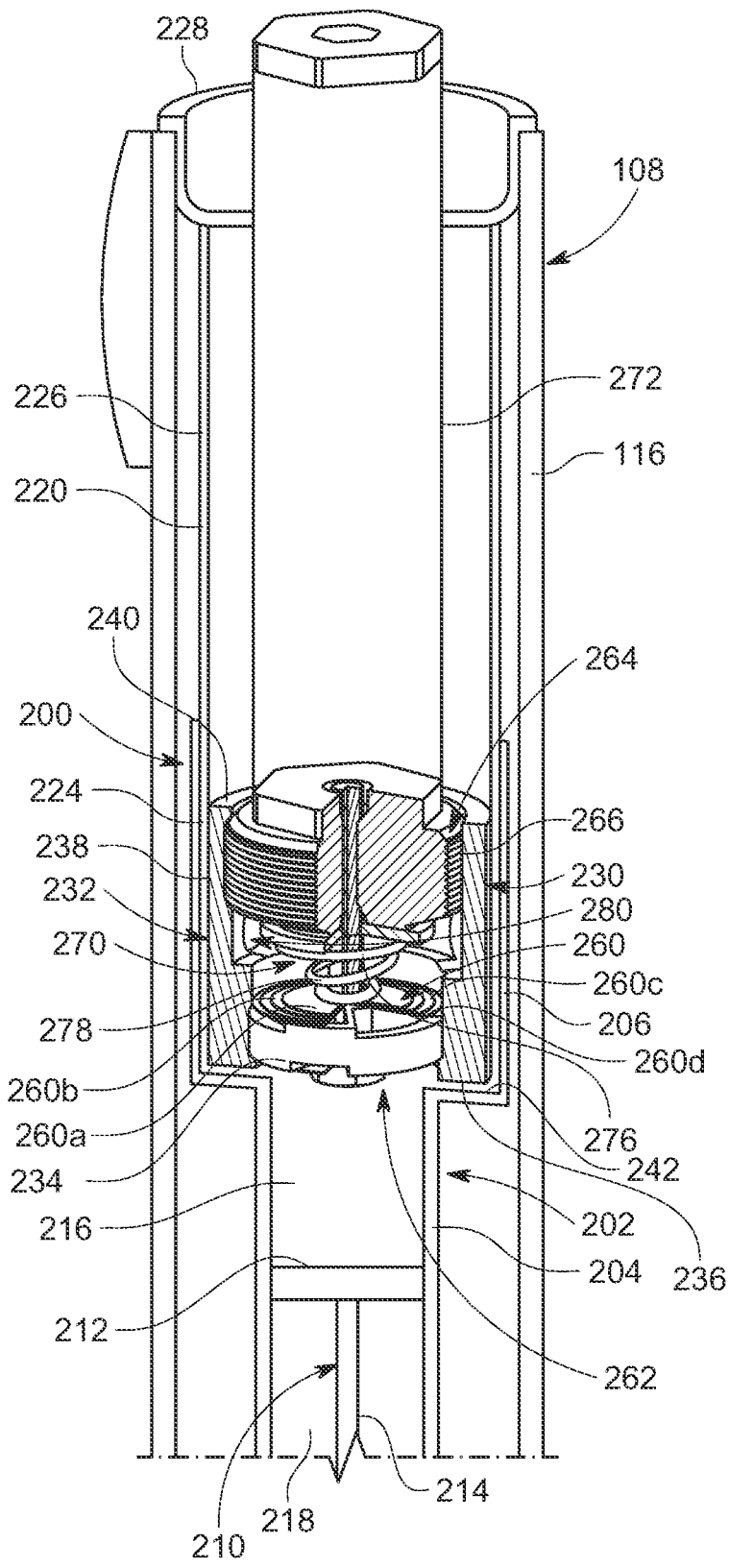
FIG. 4 illustrates an enlarged sectional view of a portion of a second fork leg with a damper arranged inside the second fork leg and depicting a compression assembly of the damper arranged inside a damper tube, in accordance with an embodiment of the disclosure.

Moreover, in some embodiments, as shown in FIGS. 1 and 4, the suspension fork 100 may include a damper 200 to dampen the reciprocating movement of the stanchions 114, 116 relative to the lowers 110, 112. In the illustrated embodiment, the damper 200 is arranged and is associated with the second fork leg 108 and is arranged inside the second fork leg 108. As shown, the damper 200 includes a damper tube 202 extending inside the stanchion 116 and having a first tube portion 204 arranged proximate to the closed end of the associated lower 112 and a second tube portion 206 having an inner diameter larger than an inner diameter of the first tube portion 204. The second tube portion 206 is disposed proximate to the crown 104 of the suspension fork 100. Moreover, the damper 200 includes a piston 210 having a piston head 212 arranged inside the first tube portion 204 and configured to reciprocate inside the first tube portion 204 dividing an inside of the first tube portion 204 into a head side chamber 216 and a rod side chamber 218. Further, the piston 210 includes a piston rod 214 extending from the piston head 212 and outwardly of the damper tube 202 and connected to the closed end of the lower 112. Piston head 212 is configured to move towards the second tube portion 206 in response to the retraction of the stanchion 116 inside the lower 112. Further, it may be appreciated that a fluid, for example, a viscous oil or air, is filled inside the head side chamber 216 to damp the reciprocating movement of the piston 210, and hence the stanchion 116 relative to the lower 112.

Moreover, the damper 200 includes a bladder 220 coupled/engaged with the second tube portion and configured to inflate or deflate in response to an entry or exit of the fluid inside the bladder 220. As shown, the bladder 220 includes a hollow cylindrical structure having a first end portion 224 arranged inside the second tube portion 206 and a second end portion 226 extending outwardly of the second tube portion 206 and inside the stanchion 116. It may be appreciated that the damper tube 202, the piston 210 and the bladder 220 are arranged coaxially to the stanchion 116 and the lower 112. Further, the damper 200 includes a cap 228 adapted to cover an open end of the bladder 220 that is disposed proximate to the crown 104 as well as cover an open end of the stanchion 116. The cap 228 may be threadably engaged with the stanchion 116 or press fitted to the stanchion 116.

Further, referring to FIG. 4, the damper 200 includes a compression assembly 230 to vary/adjust damping characteristics of the damper 200. As shown, the compression assembly 230 is arranged inside the second tube portion 206 and includes a housing 232 having a substantially hollow cylindrical structure with a circular base 234 at a first end 236 of the housing 232. As shown in FIG. 4, the housing 232 includes a wall 238 vertically extending from the base 234 to a second open end 240 of housing 232. In some embodiments, the first end 236 may be arranged abutting a step 242 defined at an interface of the first tube portion 204 and the second tube portion 206. One or more seals may be arranged second tube portion 206 and the wall 238 to prevent any flow of the fluid from the first tube portion 204 to a gap present between the cylindrical wall 238 of the housing 232 and the second tube portion 206 through the gap between the step 242 and the first end 236 of the housing 232.

Moreover, the compression assembly 230 includes a plurality of shims 260 disposed inside the housing 232 and supported on the base 234, covering an opening 262 defined by the base 234. As shown, the shims 260 are arrayed vertically and are arranged on top of each other. Also, the shims 260 are sized and arranged such that a lowermost shim 260a has a largest diameter and completely covers the opening, while the topmost shim 260d has a smallest diameter. Accordingly, diameters of the shims 260 decrease from the lowermost shim 260a to the topmost shim 260d. It may be appreciated that the shims 260 are arranged contacting the adjacent shims 260 and there is no additional structure that couple the shims 260 to each other. Further, one or more of the shims 260 may be displaced/deflected vertically relative to one or more of the remaining shims 260 due to the pressure of the fluid in the first tube portion 204 providing an outlet for exit of some of the fluid from the first tube portion 204 to an inside of the housing 232 and the then to the bladder 220 through the second tube portion 206 to decrease a resistance to the upward motion of the piston head 212 and hence relative movement of the stanchion 116 inside the lower 112.

As shown in FIG. 4, the damper 200 also includes a compression adjuster 264 having a disc structure 266 arranged inside the housing 232 and disposed in threaded engagement with the housing 232, covering the second open end 240 of the housing 232. The disc structure 266 is arranged at vertical distance from the uppermost shim 260d defining a space 270 therebetween and is configured to move towards or away from the uppermost shim 260d. The disc structure 266 is displaced towards or away from the uppermost shim 260d by screwing or unscrewing the disc structure 266 relative to the housing 232. To facilitate the screwing or unscrewing of the disc structure 266 by a user, the compression adjuster 264 includes a rod 272 extending vertically from the disc structure 266 towards the upper end of the stanchion 116 and having an end portion arranged outwardly of the stanchion 116. The disc structure 266, the rod 272, and the housing 232 are disposed substantially coaxially to the stanchion 116. Further, to apply a compression on one or more of the shims 260 and to prevent a vertical deflection of the one or more of the shims 260, while allowing the deflection of remaining shims 260 to control an exit of the fluid from the first tube portion 204, the compression assembly 230 includes a biasing member 276, for example, a conical spring 278, arranged inside the space 270 and having a first end arranged contacting at least one of the shims 260 and a second end arranged contacting a lower surface of the disc structure 266. As shown, the conical spring 278 is a coil spring with diameter of the coils of the spring 278 increasing from the first end to the second end. In an embodiment, the number of coils of the spring 278 may be selected based on the number of shims 260. In the illustrated embodiment, at an initial position, only one coil may contact the topmost shim 260a, and therefore, the shims 260b, 260c, 260d except the topmost shim 260a gets deflected upwardly as the pressure in the first tube portion 204 increases, due to travel of the piston 210 towards the second tube portion 206. Accordingly, a relatively large opening or port is opened to allow an exit of the large amount of fluid from the first tube portion 204 through the shims 260, providing relatively less damping to reciprocation motion of the stanchions 114, 116 relative to the lowers 110, 112.

To adjust the damping characteristics, the user may rotate the rod 272 so as to move/displace the disc structure 266 towards the shims 260, causing a compression of the spring 278. Due to a predetermined compression of the spring 278, two coils may contacting the shims 260, for example, the first coil may contact the first shim 260a, and the second coil 260b may contact the second shim 260b. Accordingly, due to the compression force applied by the coils on the two shims 260a, 260b, the deflection of the two uppermost shims 260a, 260b is prevented/restricted, while remaining shims 260c, 260d may deflect due to pressure of the fluid as the piston 210 moves towards the second tube portion 206. This causes a relatively less area/opening through which the fluid may exit the first tube portion 204, and therefore increasing the resistance to the reciprocating motion of the stanchions 114, 116 relative to the lowers 110, 112. In this manner, the damping is varied by varying the compression of the spring 278 and varying the number of shims 260 that are in contact with and under compression from the spring 278. To allow the exit of the fluid from an inside of the housing 232, the cylindrical wall 238 defines an outlet port 280 through which the fluid flows inside bladder 220 from the housing 232.

Figure 5:
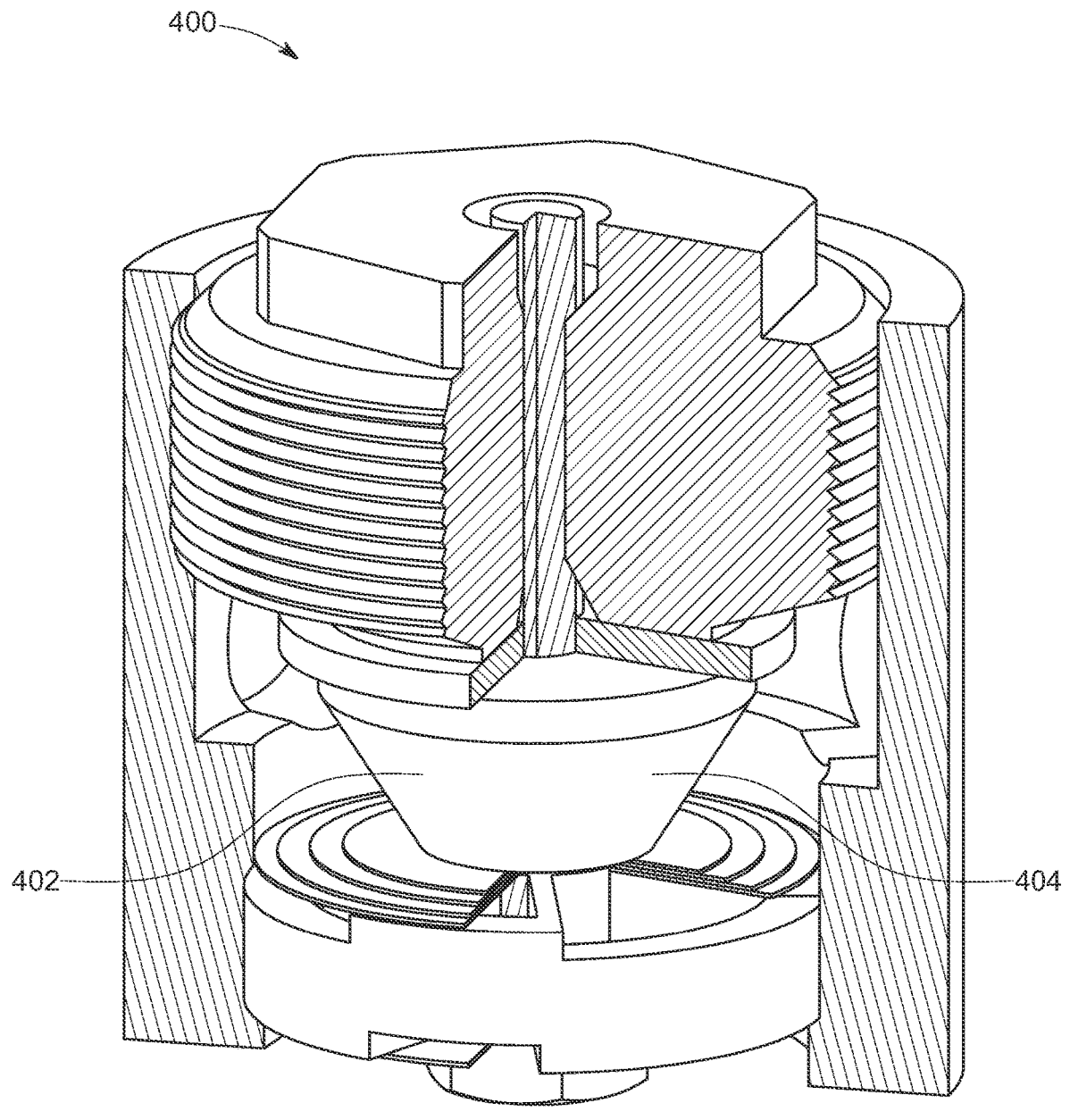
FIG. 5 illustrates a sectional perspective view of a compression assembly, in accordance with an alternative embodiment of the disclosure.

Referring to FIG. 5, a compression assembly 400 according to an alternative embodiment is shown. The compression assembly 400 is similar to the compression assembly 230 except that a biasing member 402 of the compression assembly is a flexible bush 404 having a frustoconical shape instead of the coil spring 278.

Figure 6:
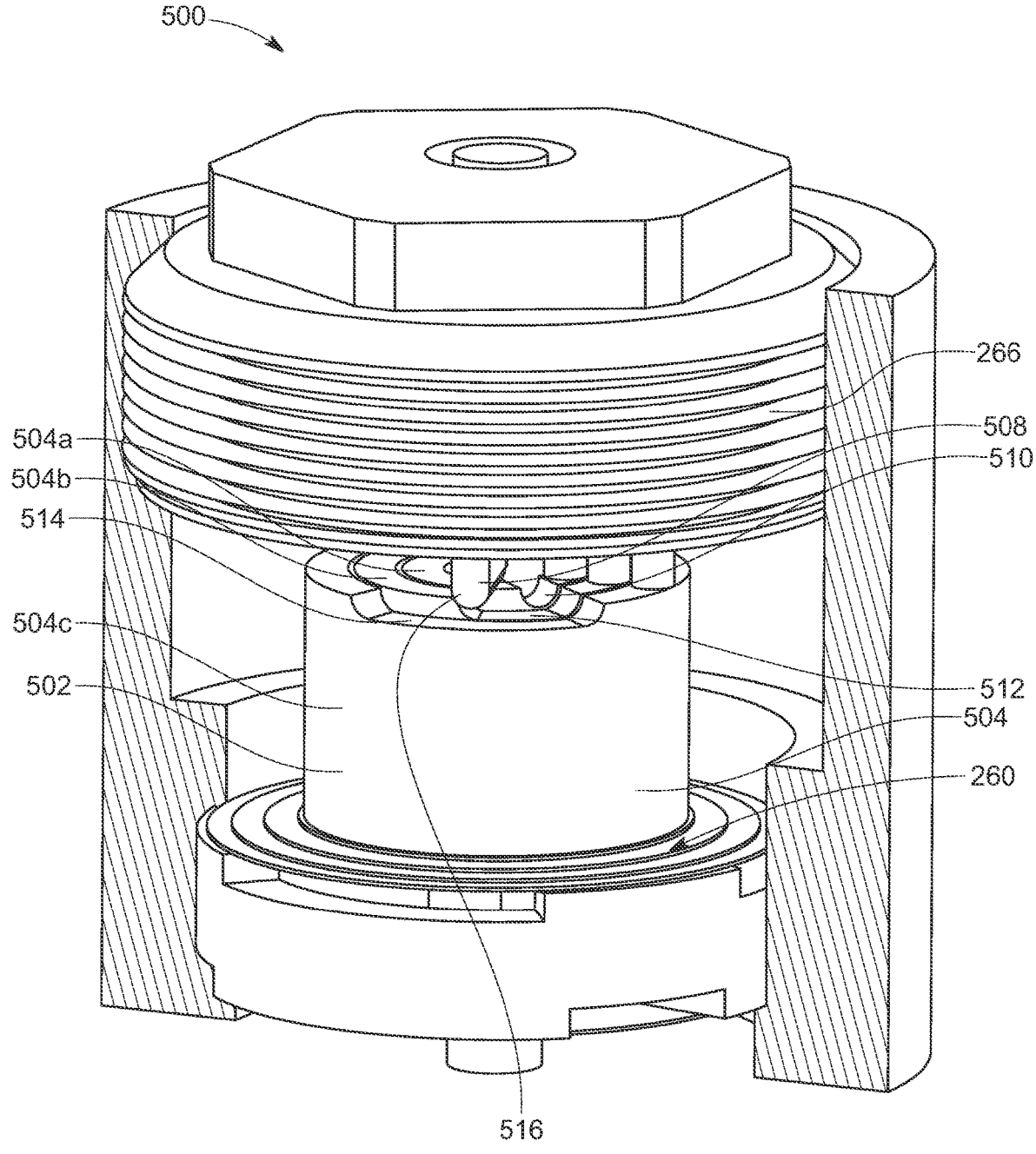
FIG. 6 illustrates a sectional perspective view of a compression assembly, in accordance with yet another embodiment of the disclosure.

Referring to FIG. 6, a compression assembly 500 according to yet another embodiment is shown. The compression assembly 500 is similar to the compression assembly 230 except a biasing member 502 of the compression assembly 500 is different from the biasing member 276 of the compression assembly 230. Also, the compression assembly 500 includes an actuator 508 connected with the disc structure 266 to operate the biasing member 502 to compress one or more of the shims 260 to vary a size of the opening through the shims 260 to vary the flow of fluid exiting the first tube portion 204 to vary the damping provided by the damper. As shown, the biasing member 502 includes a plurality of nested and coaxial cylinders 504 arranged between the shims 260 and the disc structure 266. As shown, the plurality of cylinders 504 includes three cylinders, for example, an inner cylinder 504a, an outer cylinder 504c, and an intermediate cylinder 504b arranged between the inner and outer cylinders 504a, 504c. Each of the cylinders 504 defines a depression that interacts with the actuator 508 to cause the associated cylinder among the cylinders 504 to disengage from the one or more of the shims 260. For example, the inner cylinder 504a, the intermediate cylinder 504b, and the outer cylinder 504c, defines a first depression 510, a second depression 512, and a third depression 514, respectively, that arranged proximate to the disc structure 266. As shown, an angular/arc length of the first depression 510 is smaller than am angular/arc length of the second depression 512 which is smaller in length than that of the third depression 514. The depressions 510, 512, 514 are oriented or located such that first ends of the depressions 510, 512, 514 align with each other, while second ends of the depressions 510, 512, 514 are arranged at separate angular locations.

To engage and disengage one or more of the cylinders 504 with the one or more of the shims 260, the actuator is operated/rotated around a central axis of the housing 232 by rotating the rod 272. As shown, the actuator 508 includes a tab 516 extending downwardly from the disc structure 266 and extending in a radial direction from a central axis of the disc structure 266. A radial length of the tab 516 is selected such that the tab 516 is configured to engage with each of the cylinders 504. To push/engage only one cylinder with one or more of the shims 260, the tab 516 is displaced and arranged such that the tab 516 contacts only the inner cylinder 504a i.e., tab is arranged at a location outside the first depression 510, while being arranged directly above the second and third depressions 512, 514. Similarly, to engage the two cylinders with the shims 260, i.e., inner and intermediate cylinders 504a, 504b with the shims 260, the tab 516 is positioned at location outside of the first and second depressions 510, 512 only, while being arranged directly above the third depression 514, thereby engaging and pushing the two cylinders 504a, 504b on the shims 260. For engaging all three cylinders 504 with the shims 260, the tab 516 is positioned at location outside of the all the depressions 510, 512, 514, thereby engaging with and pushing the cylinders 504 downwardly. In this manner, by changing the number of cylinders 504 that engages and exerts force on the shims 260, the damping characteristics are varied.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A suspension fork, comprising:
   a steerer tube;
   a crown attached to the steerer tube;
   a pair of fork legs extending from the crown, each of the fork legs having a hollow stanchion telescopically inserted into an open end of a hollow lower;
   a piston having a piston rod secured to at least one of the lowers and a piston head and a seal disposed in the corresponding stanchion, the piston head separating the stanchion into a positive and a negative air spring chamber;
   a base disposed inside the stanchion and secured to the stanchion, wherein the base is arranged between a closed end of the lower and the piston head, and the negative air spring chamber is defined between the piston head and the base, the base defines at least one communication port to enable a flow of air between the hollow lower and the negative air spring chamber; and
   a floating piston slidably disposed inside the negative air spring chamber and dividing the negative air spring chamber into a first chamber and a second chamber, wherein the floating piston is adapted to move towards the piston head in response to a pressure created inside the lower during a translation of the stanchion towards the closed end of the lower to facilitate a passage of air from the lower to the second chamber through the at least one communication port.

2. The suspension fork of claim 1 further including a stopper arranged inside the first chamber and spaced apart from the base defining a travel stoke of the floating piston therebetween.

3. The suspension fork of claim 2, wherein the stopper is coupled to the base via a vertically extending tube arranged coaxially and surrounding the piston rod.

4. The suspension fork of claim 3, wherein the stopper extends radially outwardly of the tube and an exit port is defined between a free end of the stopper and the stanchion.

5. The suspension fork of claim 4, wherein a piston chamber is defined between the piston head and the stopper, and the air flow from the first chamber to the piston chamber through the exit port in response to the movement of the floating piston towards the piston head.

6. The suspension fork of claim 1, wherein the floating piston is selected such that the floating piston starts moving towards the piston head during an end portion of a retraction stroke of the stanchion inside the lower.

7. A shock absorber, comprising:
a first tube;
a second tube telescopically inserted into an open end of the first tube;
a piston having a piston rod secured to the first tube and a piston head disposed inside the second tube, the piston head separating the second tube into a positive and a negative air spring chamber;
a base disposed inside the second tube and secured to the second tube, wherein the base is arranged between a closed end of the first tube and the piston head, and the negative air spring chamber is defined between the piston head and the base, the base defines at least one communication port to enable a flow of air between the first tube and the negative air spring chamber; and
a floating piston slidably disposed inside the negative air spring chamber and dividing the negative air spring chamber into a first chamber and a second chamber, wherein the floating piston is adapted to move towards the piston head in response to a pressure created inside the first tube during a translation of the second tube towards the closed end of the first tube to enable a passage of air from the first tube to the second chamber through the at least one communication port.

8. The shock absorber of claim 7 further including a stopper arranged inside the first chamber and spaced apart from the base defining a travel stoke of the floating piston therebetween.

9. The shock absorber of claim 8, wherein the stopper is coupled to the base via a vertically extending tube arranged coaxially and surrounding the piston rod.

10. The shock absorber of claim 9, wherein the stopper extends radially outwardly of the tube and an exit port is defined between a free end of the stopper and the second tube.

11. The shock absorber of claim 10, wherein a piston chamber is defined between the piston head and the stopper, and the air flow from the first chamber to the piston chamber through the exit port in response to the movement of the floating piston towards the piston head.

12. The shock absorber of claim 7, wherein the floating piston is selected such that the floating piston starts moving towards the piston head during an end portion of a retraction stroke of the second tube inside the first tube.

13. A suspension fork, comprising:
a steerer tube;
a crown attached to said steerer tube;
a pair of fork legs extending from the crown, each of the fork legs having a hollow stanchion telescopically inserted into an open end of a hollow lower;
a piston having a piston rod secured to at least one of the lowers and a piston head and a seal disposed in the corresponding stanchion, the piston head separating the stanchion into a positive and a negative air spring chamber;
a base disposed inside the stanchion and secured to the stanchion, wherein the base is arranged between a closed end of the lower and the piston head, and the negative air spring chamber is defined between the piston head and the base, the base defines at least one communication port to enable a flow of air between the hollow lower and the negative air spring chamber;
a floating piston slidably disposed inside the negative air spring chamber and dividing the negative air spring chamber into a first chamber and a second chamber, wherein the floating piston is adapted to move towards the piston head in response to a pressure created inside the lower during a translation of the stanchion towards the closed end of the lower to enable a passage of air from the lower to the second chamber through the communication port; and
a stopper arranged inside the first chamber and spaced apart from the base to limit a movement of the floating piston in a direction towards the piston head from the base.

14. The suspension fork of claim 13, wherein the stopper is coupled to the base via a vertically extending tube arranged coaxially and surrounding the piston rod.

15. The suspension fork of claim 14, wherein the stopper extends radially outwardly of the tube and an exit port is defined between a free end of the stopper and the stanchion.

16. The suspension fork of claim 15, wherein a piston chamber is defined between the piston head and the stopper, and the air flow from the first chamber to the piston chamber through the exit port in response to the movement of the floating piston towards the piston head.

17. The suspension fork of claim 13, wherein the floating piston is selected such that the floating piston starts moving towards the piston head during an end portion of a retraction stroke of the stanchion inside the lower.

* * * * *